Patented Nov. 30, 1948

2,455,118

UNITED STATES PATENT OFFICE 2,455,118

ADHESIVE AND METHOD OF JOINING ELEMENTS THEREWITH

Gustav E. Guellich, Buffalo, N. Y., assignor, by mesne assignments, to American Optical Company, Southbridge, Mass., a voluntary association No Drawing. Application February 11, 1943, Serial No. 475,552

3 Claims. (Cl. 154—128)

This invention relates to adhesives and has particular reference to a new and improved cement for joining together optical elements such as lenses, prisms, etc., and also the method of joining such elements with said adhesives.

An object of the invention is to provide a new and improved cement of the type set forth which is of suitable refractive index and sufficiently free from color that it will not interfere with the optical performance of optical elements joined thereby.

Another object of the invention is to provide a new and improved cement of the type set forth which is capable of being rendered insoluble in organic solvents, and which is less brittle and retains its relatively high tensile strength over a relatively wide range of temperatures.

Another object of the invention is to provide a new and improved cement of the type set forth which can be applied at room temperature if desired thereby requiring less careful and skillful handling.

Another object of the invention is to provide a new and improved cement of the type set forth which is inherently more stable than prior type adhesives for the purpose set forth.

Another object of the invention is to provide a new and improved method of joining elements with an adhesive of the type set forth herein.

Other objects and advantages of the invention will be apparent from the following description. It will be understood that many changes may be made in the proportions, solvents, plasticizers, accelerators and steps of the process indicated, as well as the steps of the curing process, without departing from the spirit of the invention as set forth in the accompanying claims. I, therefore, do not wish to be limited to the exact details and steps of the process described as the preferred form has been given by way of illustration only.

In the past, the adhesive commonly employed for joining optical elements together was Canada balsam, and recently there have been some uses of thermoplastic materials such as methyl methacrylate and similar materials, also in special cases linseed oil was used for joining optical elements.

In the case of Canada balsam a number of disadvantages were encountered. Among these were that upon exposure to heat the cement softened and a shift sometimes occurred between the joined elements making necessary the removal of the elements from the instrument for recementing. Also with this adhesive it was necessary that the adhesive be heated and the parts to be joined also be heated prior to the joining operation. This was time consuming and consequently expensive and also required a considerable amount of handling of the optical elements.

Also this Canada balsam remains substantially soluble in most organic solvents. In order to eliminate reflections it has been found desirable to paint the edges of the joined elements or lenses with a black paint which necessarily contained an organic solvent and consequently there was considerable danger of the solvent in the paint penetrating into the Canada balsam between the joined surfaces causing the black pigment to penetrate the space between the joined elements and also tending to separate the elements or induce the formation of bubbles or the like between the joined surfaces thereby interfering with the optical quality of the finished product.

In the case where linseed oil was employed, the fact that linseed oil dries by oxidation only was a distinct disadvantage. The drying of linseed oil by oxidation between joined optical elements frequently required long periods of time such as many weeks and therefore seriously interfered with production of devices embodying such joined elements.

The chief disadvantage of the methyl methacrylate joined elements was that such material was thermoplastic and therefore subject to softening by heat and pressure.

If such methods were employed in devices to be used in warm climates or in struments subject to heating such as projectors, such heat would produce flow of said thermoplastic material thus producing misalignment or even separation of said optical elements. Also such thermoplastic materials required a considerably difficult and expensive technique and equipment in its application.

It, therefore, is the principal object of the present invention to provide an adhesive or cement particularly adapted for the joining of optical elements, which adhesive or cement may be applied at room temperature thereby eliminating the preheating of the optical parts and adhesive and which is of suitable refractive index and capable of being rendered insoluble in organic solvents and which therefore is free of the difficulties encountered in the prior art and a method of joining optical elements with an adhesive of the type set forth.

The adhesive or cement of the present invention comprises broadly a solution of dewaxed and preferably bleached shellac in butyl alcohol or amyl alcohol or isopropyl alcohol or other suitable solvents or mixtures thereof with or without the addition of plasticizers such as tricresyl phosphate or castor oil or dibutylphthalate or other suitable plasticizers with or without the addition of an accelerator such as urea or thiourea or zinc chloride or other suitable accelerators.

The solvents employed are alcohols and preferably alcohols of the types given above. Another solvent that might be used is pyridine.

An example of a formula of an adhesive fulfilling the above characteristics would be a solution containing fifty per cent by weight of bleached and dewaxed shellac and fifty per cent n-butyl alcohol. This example is of a form of adhesive which does not contain any plasticizer or accelerator but which would provide the desired advantages over the prior art forms.

Another example which contains a plasticizer but not an accelerator would be a solution containing fifty per cent by weight of dewaxed and bleached shellac with five per cent by weight of tricresyl phosphate and forty five per cent by weight of isopropyl alcohol. In this case the tricresyl phosphate acts as a plasticizer and makes the resultant adhesive or cement more pliable.

Where it is not necessary that the adhesive or cement be perfectly clear or transparent to allow the passage of light therethrough without any appreciable scattering of light, a suitable accelerator such as urea or thiourea or zinc chloride may be mixed with either of the solutions given above.

To join elements with the adhesive of this application, said adhesive is applied to one or both of the surfaces to be joined and the two surfaces are brought into contact and retained in said position either by gravity or by suitable fixtures, and then heat treated as hereinafter described.

Where the optical elements to be joined are relatively large in area it has been found preferable to heat the solution given above either in air or in a vacuum until the solvent has evaporated completely and then apply it immediately to one or both of the preheated surfaces which are to be joined and maintain said surfaces at a temperature sufficient to cause the shellac to set and become substantially insoluable in organic solvents.

The present adhesive possesses the advantage over prior art types in that it provides an adhesive which is substantially insoluble in organic solvents.

After the parts or elements have been joined together as described above the joined elements are heat treated to first remove any residual solvents and secondly set the cement permanently by polymerization.

This heat treatment generally comprises first heating said joined elements at a relatively low temperature for a time sufficient to allow the solvent to evaporate completely and then to heat said joined elements at a higher temperature for a time sufficient to cause said adhesive to set by polymerization. The change from the first or evaporating temperature to the second or higher temperature may be accomplished by either gradually increasing the temperature of the oven or by transferring the object into a second oven which has been heated to the higher temperature.

This heating may be accomplished either in an oven or by radiation from an infra-red source in which case the temperature is controlled by the distance at which the object is positioned with respect to the lamp and the voltage supplied to the lamp. Also said heating may be accomplished by known high frequency heating methods.

In order to avoid undue stress in the glass, slow cooling should be used, particularly where the elements are rather large or the joined surfaces are of relatively large area.

One example of a heat treating schedule may consist of heating the joined parts for ten hours at 125 degrees Fahrenheit to evaporate the solvent and then heating said joined parts for twenty hours at 175 degrees Fahrenheit to polymerize the adhesive and then slow cooling of the joined parts.

This heat treating may be varied over a fairly wide range and may consist of heating the joined parts for a period of six to twenty four hours at a temperature of from 100 degrees Fahrenheit to 135 degrees Fahrenheit to evaporate the solvent and then heating said joined parts for a period of from twelve to forty eight hours at a temperature of from 150 degrees Fahrenheit to 250 degrees Fahrenheit to polymerize the adhesive, and then slow cooling.

The higher temperatures are preferably employed for the shorter heating periods and the length of said heating periods depend on the temperatures employed.

From the above it will be seen that I have provided simple, efficient and economical means for obtaining all of the objects and advantages of the invention.

Having described my invention, I claim:

1. An adhesive for joining optical elements consisting of substantially 50 per cent by weight of dewaxed shellac, substantially 45 per cent by weight of a solvent selected from the group consisting of butyl alcohol, amyl alcohol, and isopropyl alcohol and substantially 5 per cent by weight of a plasticizer selected from the group consisting of castor oil, tricresyl phosphate and dibutylphthalate, said cement being substantially colorless and free of opaque particles.

2. The combination of a pair of optical elements having similarly shaped adjacent surfaces and a layer of substantially insoluble cement therebetween for permanently uniting said elements in a predetermined relation for the transmission of light through said elements and said layer, the cement forming said layer being in the form of a relatively thin transparent and substantially colorless film of de-waxed bleached shellac in a substantially completely polymerized state, whereby substantially none of the light passing through said optical elements and said layer will be scattered or absorbed by said layer.

3. The method of permanently joining adjacent surfaces of optical elements so that a substantially colorless, transparent joint will be formed therebetween and so that light may be transmitted through said elements and through said joint with a minimum of absorption and scattering of said light by said joint, comprising applying to one of said surfaces to be joined an adhesive consisting of a de-waxed shellac and a solvent consisting of a higher boiling alcohol, placing said surfaces in contact and retaining said surfaces in contact while first heating same at a relatively low temperature for slowly evaporating the solvent therefrom, and then raising the temperature and heating the elements and said adhesive at a temperature ranging from 150° F. to 250° F. for a time sufficient to substantially completely polymerize said shellac and permanently unite said elements.

GUSTAV E. GUELLICH.

REFERENCES CITED

The following references are of record in the file of this patent:

UNITED STATES PATENTS

| Number | Name | Date |
|---|---|---|
| 1,646,731 | Hudson | Oct. 25, 1927 |
| 1,980,970 | Monro | Nov. 13, 1934 |
| 2,024,389 | Renfrew | Dec. 17, 1935 |
| 2,606,928 | Damitz | Nov. 17, 1936 |
| 2,085,170 | Rankin | June 29, 1937 |
| 2,140,657 | Strauss | Dec. 20, 1938 |
| 2,227,720 | Kallender | Jan. 7, 1941 |
| 2,274,706 | Keim | Mar. 3, 1942 |

OTHER REFERENCES

Indian Lac Research Institute, Research Note No. 14, March 1934.